CONSTRAINED BRIDGE MAGNETIC AMPLIFIER

Filed Sept. 20, 1955 3 Sheets-Sheet 1

INVENTORS
JOSEPH A. FINGERETT
FRANK A. HILL
BY
Theodore H. Lassagne
ATTORNEY

CONSTRAINED BRIDGE MAGNETIC AMPLIFIER

Filed Sept. 20, 1955 3 Sheets-Sheet 2

INVENTORS
JOSEPH A. FINGERETT
FRANK A. HILL
BY
Theodore H. Lassagne
ATTORNEY

INVENTORS
JOSEPH A. FINGERETT
FRANK A. HILL
BY
Theodore H. Lassagne
ATTORNEY

Patented Aug. 5, 1958

2,846,525

CONSTRAINED BRIDGE MAGNETIC AMPLIFIER

Joseph A. Fingerett, Pacoima, and Frank A. Hill, Van Nuys, Calif., assignors to Librascope, Incorporated, Glendale, Calif., a corporation of California Application September 20, 1955, Serial No. 535,423

13 Claims. (Cl. 179—171)

This invention relates to magnetic amplifiers and more particularly to magnetic amplifiers for producing output pulses of considerable power.

Technological advances have been so rapid in recent years that movements to a high degree of accuracy are now often required. For example, in industry the movements of a cutting tool often have to be of a high degree of accuracy so that intricate parts of great precision can be produced. In order to produce such accurate movements, servo techniques are often employed. In servo operations, a signal is produced to indicate any error in the movements of an output member such as a cutting tool. The error signal is often quite weak and has to be considerably amplified before it can be properly used.

Magnetic principles are used in one type of amplifier for increasing the gain of such signals as error signals. The magnetic amplifiers employ saturable cores to produce an output signal upon the saturation of at least one of the cores. Magnetic amplifiers are advantageous because they have a relatively fast response and give considerable power gains. However, even though the power gains are considerable, they are not nearly as great as might sometimes be required. For this reason, multiple numbers of stages have had to be used in cascade arrangement to obtain the desired output.

This invention provides a magnetic amplifier which has a fast response and which gives power gains considerably in excess of other magnetic amplifiers now in use. The magnetic amplifier constituting this invention is also advantageous because of its high power efficiency. The amplifier is efficient because it transfers to a load a high percentage of the power introduced to the amplifier. Another advantage of the magnetic amplifier results from the fact that it is able to serve as a memory device for retaining in successive cycles of line voltage signal information introduced to the amplifier in previous cycles.

The magnetic amplifier includes first and second saturable cores each having a pair of windings disposed in magnetic proximity to the cores. The windings in each pair are conncted in a bridge arrangement such that the windings in a pair form opposite legs of the bridge. A unidirectional member such as a diode is connected in the bridge to provide a low impedance path for the flow of a large current through the windings in a pair upon the saturation of the associated core. The large current flowing through the windings upon the saturation of the associated core also flows through a suitable load to produce a considerable power output across the load.

Because of the bridge arrangement and the connection of the diode in the bridge, the windings associated with the unsaturated core receive substantially no current after the first core saturates. This causes the second core to remain at substantially the same flux level during the remainder of the half cycle so as to serve as a memory for the next half cycle of operation.

Figure 1:
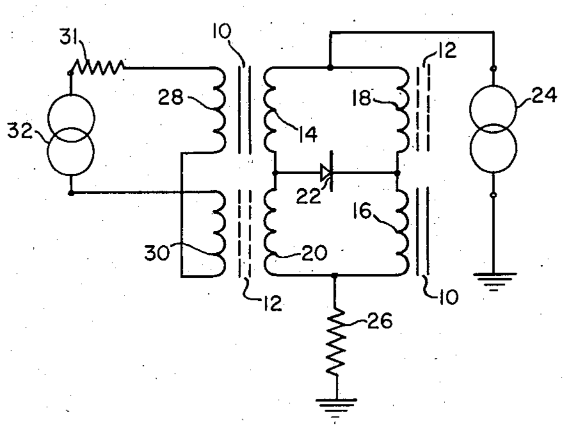
Figure 1 is a circuit diagram somewhat schematically illustrating one embodiment of the invention.
Figure 5:
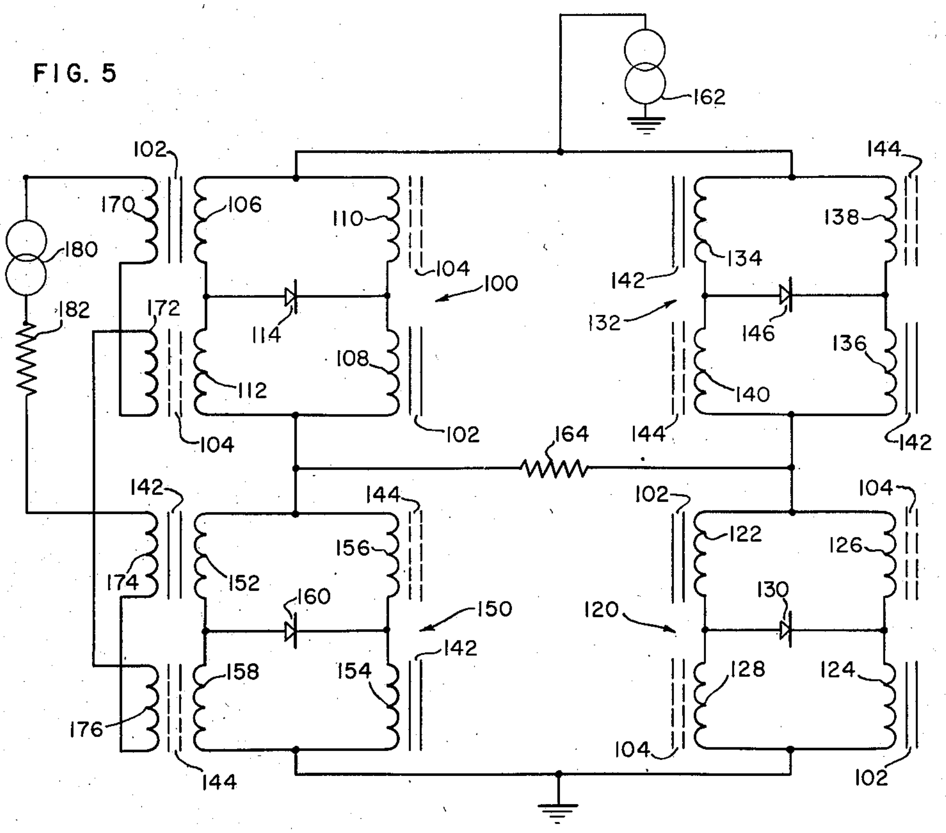
Figure 6:
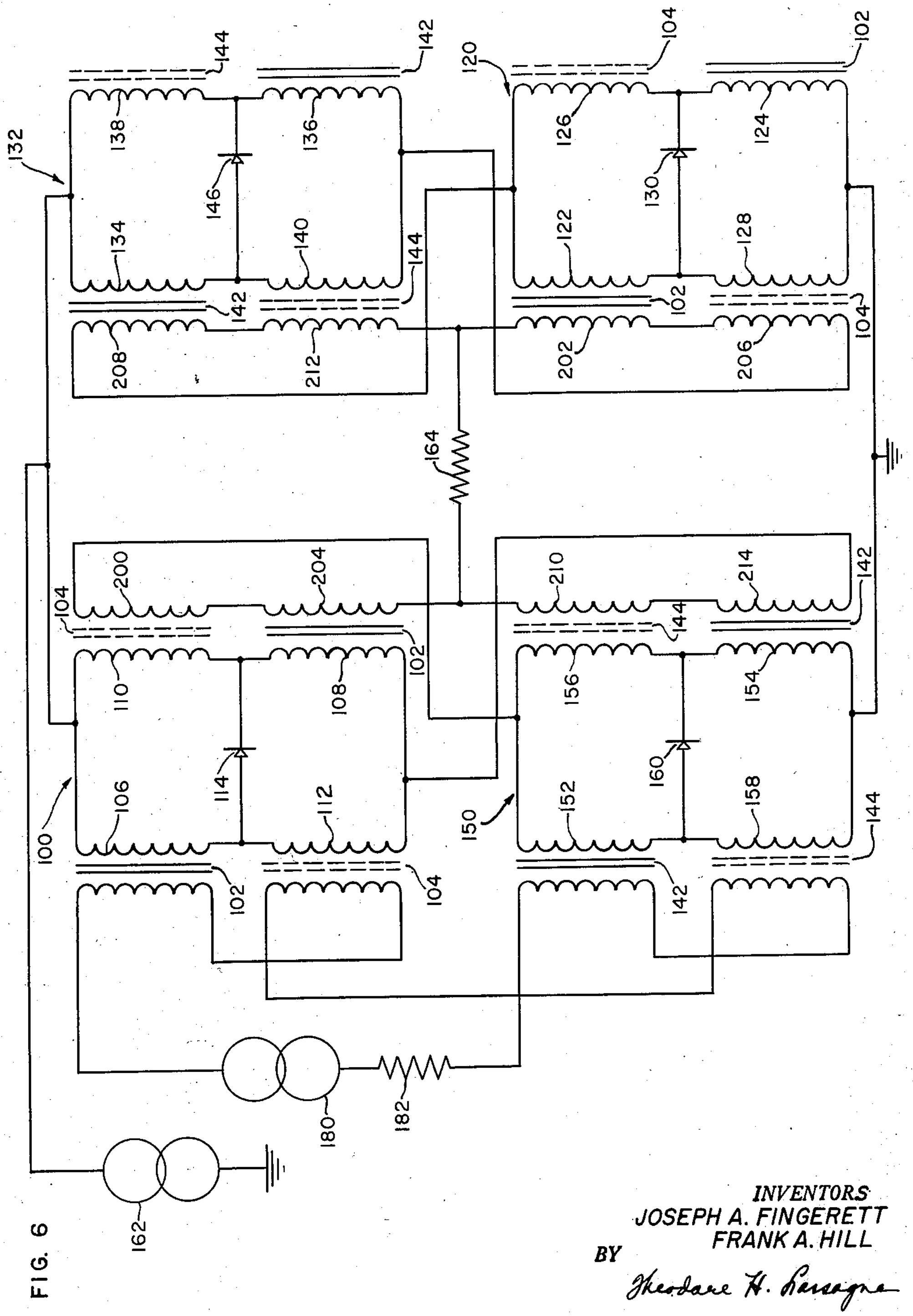
Figure 4:
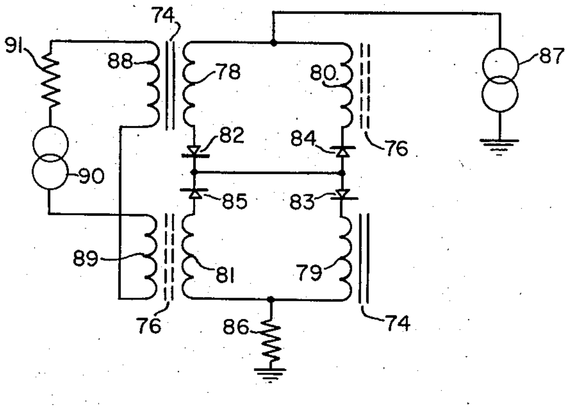

Figures 3*a* to 3*e*, inclusive, illustrate voltage wave forms at strategic terminals of the embodiment shown in Figure 1;

Figure 4 is a circuit diagram schematically illustrating a modification of the embodiment shown in Figure 1;

Figure 5 is a circuit diagram schematically illustrating a second embodiment of the invention; and Figure 6 is a circuit diagram schematically illustrating a modification of the embodiment shown in Figure 5.

In the embodiment of the invention shown in Figure 1, a pair of cores 10 and 12 are provided. The core 10 is indicated in Figure 1 by a pair of solid lines and the core 12 is indicated by a pair of broken lines to set it off from the core 10. The particular cores used may be provided with a suitable shape such as a toroid to produce a closed loop for the flow of magnetic flux with no air gaps in the loop.

The cores 10 and 12 may be made from material manufactured by Magnetics, Inc., of Butler, Pennsylvania, and designated as "Orthonol" by that company. The particular cores used may be purchased from Magnetics, Inc., by their trade number 50061–2A. The core material is composed of approximately 50 percent nickel and 50 percent iron and is made from a material which is rolled only in a particular direction and which is annealed in hydrogen to grain orient the material.

A pair of windings 14 and 16 are disposed in magnetic proximity to the core 10. Preferably the windings are formed from a plurality of turns wound on the core so as to produce an optimum magnetic coupling with the core. For example, each of the windings 14 and 16 may be formed from approximately 1,000 turns of No. 36 wire. In like manner, windings 18 and 20 are magnetically associated with the core 12. The windings 18 and 20 may be formed from the same number of turns of wire as the windings 14 and 16 so as to be provided with characteristics similar to the windings 14 and 16.

The windings 14, 16, 18 and 20 are connected in a bridge arrangement. One terminal of the bridge is formed by a common connection between the windings 14 and 18 and an opposite terminal of the bridge is formed by a common connection between the windings 16 and 20. The windings 14 and 20 are connected together at a third terminal of the bridge and the windings 16 and 18 are connected together at a fourth terminal of the bridge. A diode 22 is connected between the third and fourth terminals of the bridge such that the plate of the diode has a common connection with the windings 14 and 20 and the cathode of the diode has a common connection with the windings 16 and 18.

The bridge network formed by the windings 14, 16, 18 and 20 is adapted to receive alternating line voltage from a suitable source such as that indicated at 24 in Figure 1. The source 24 is adapted to provide a suitable voltage such as approximately 115 volts at a suitable frequency such as approximately 60 cycles per second. One terminal of the source 24 may be grounded and the other terminal of the source may be connected to the bridge terminal formed by the common connection between the windings 14 and 18. The source 24 and the bridge are in series with a load 26 such as a resistance. The load 26 may have one terminal grounded and may have its other terminal connected to the bridge terminal formed by the common connection between the windings 16 and 20. The load 26 may be provided with a suitable value such as approximately 1,000 ohms.

In addition to the windings 14 and 16, a winding 28 is magnetically associated with the core 10. The winding 28 is preferably formed from a plurality of turns of wire wound on the core 10. For example, approximately 300 turns of No. 39 wire may be wound on the core 10 to form the winding 28. In like manner, a winding 30 having characteristics similar to the winding 28 is disposed in magnetic proximity to the core 12.

The windings 28 and 30 are connected on a differential basis relative to the connections provided for the windings 14, 16, 18 and 20 in the bridge formed by these latter windings. Because of such differential connections, a flow of current through the windings 28 and 30 causes the winding 28 to produce magnetic flux in one direction in the core 10 and the winding 30 to produce magnetic flux in the opposite direction in the core 12. The differential operation of the windings 28 and 30 may be obtained by connecting the bottom terminals of the windings in Figure 1. The upper terminals of the windings are connected in series with a resistance 31 and a suitable source 32 of signal voltage. The source 32 is shown in Figure 1 as providing an alternating signal but it should be appreciated that a direct signal may also be used.

It is well known that magnetic cores produce a changing magnetic flux when a voltage is applied to a winding supported on the core. If a voltage is applied to the winding for a sufficient period of time, the core may become magnetically saturated. The core becomes magnetically saturated with flux of a negative polarity when a voltage of a first polarity is applied to the winding on the core for a particular period of time. The core becomes positively saturated when the same voltage of the opposite polarity is applied to the winding for the same length of time.

During the time that a core is not saturated, it produces increased amounts of magnetic flux as a voltage of one polarity is applied. For certain core materials such as that used in the cores of this embodiment, small increases in current may cause large increases in the rate of change of magnetic flux. Since increases in rate of change of flux are equivalent to electromotive force—in other words, voltage—a large increase in voltage can be produced by a small increase in current (incremental magnetizing current) when the core remains unsaturated. This may be seen by the steep sides of the curve shown in Figure 2, such sides being designated as 40 and 42. Because of the large increase in voltage required to produce a small increase in current, the impedance presented by the winding may re relatively large during periods of core unsaturation. For example, each of the windings 14, 16, 18 and 20 may have impedances of approximately 100,000 ohms when their associated cores remain unsaturated.

When a core becomes magnetically saturated, increases in current through its associated winding produce substantially no increase in magnetic flux. Because of the lack of any increase in flux in the core, no voltage is induced in the winding. This may be seen by the horizontally flat portions 44 and 46 in the hysteresis loop shown in Figure 2. Since impedance is represented by the ratio between the voltage and the current, the winding has substantially zero impedance when its associated core becomes saturated. For example, the winding 14 presents a very low impedance when the core 10 becomes saturated.

The performance of a magnetic core at any instant is dependent upon certain characteristics of the core. For example, the performance of the core is dependent, among other factors, upon the cross-sectional area of the core and the magnetic material from which it is made. The characteristics of the core in turn determine how long a period of time is required to change the core from a negative saturation to a positive saturation, or vice versa, when a particular voltage is imposed on the winding associated with the core. Increases in voltage result in a decrease in the time required to change the polarity of core saturation. Similarly, increased periods of time are required to saturate a core for decreases in voltage applied to the associated winding.

The combination of voltage and time required to convert a core from one polarity of saturation to the opposite polarity of saturation has been defined as the "volt-seconds capacity" of the core. The term "volt-seconds" can be mathematically described as the integral of voltage with respect to time. Thus, $$\text{Volt-seconds} = \int_0^t V\,dt$$

where $V$=the voltage at any instant; and $dt$=an infinitesimal increase in time from that instant.

Figure 2:
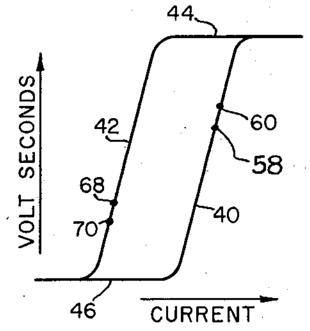
Figure 2 shows a curve illustrating certain magnetic characteristics of each of the cores forming a part of the embodiment shown in Figure 1.

Since the volt-seconds level of a core at any instant is dependent upon the value of the volt-seconds which have been applied through an associated winding previous to that instant, the curve shown in Figure 2 represents the relationship between current and volt-seconds. The value of the current is represented along the horizontal axis and the amount of volt-seconds is represented along the vertical axis. As will be seen in Figure 2, the portions 40 and 42 are relatively steep and the portions 44 and 46 are relatively flat such that a response curve approaching a rectangle is produced. Such a response curve is desirable for reasons which will become apparent in the subsequent discussion.

Figures 3A, 3B, 3C, 3D, 3E:
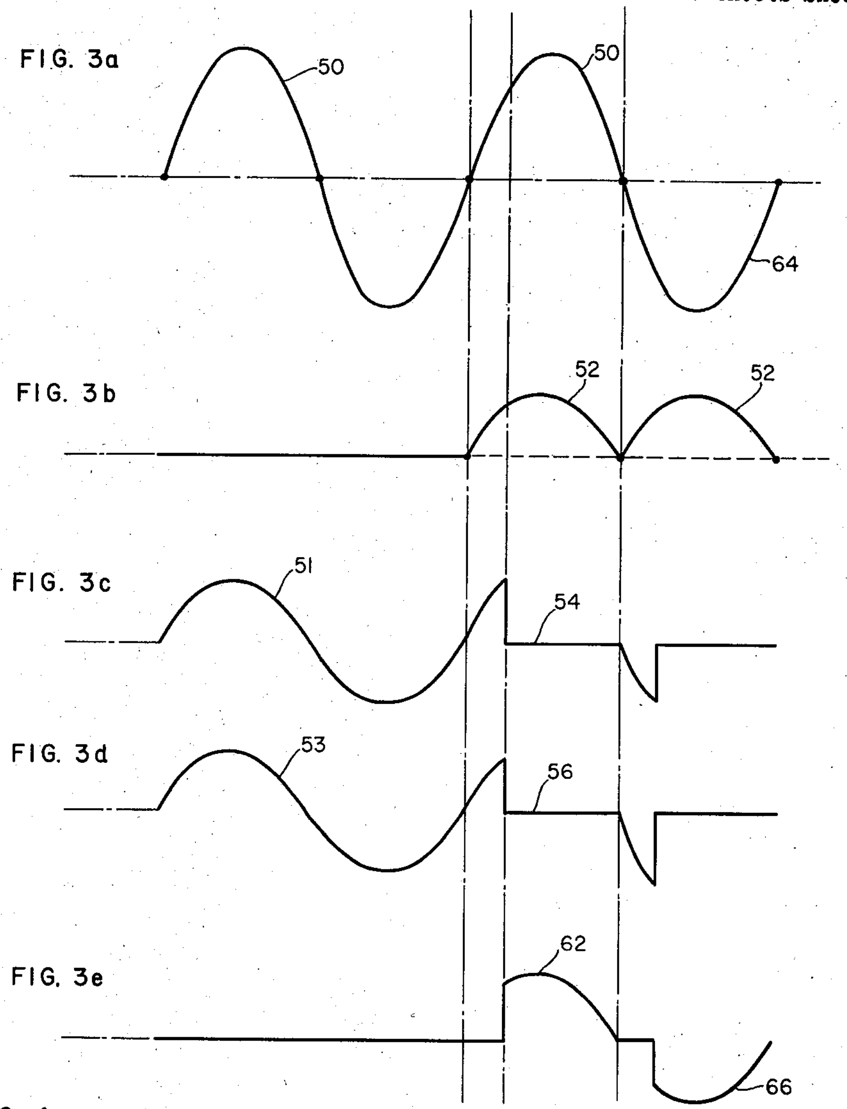

When a positive signal is applied from the source 24 as represented by a positive voltage on the ungrounded terminal of the source and as indicated at 50 in Figure 3*a*, magnetizing current flows downwardly through the windings 14 and 20 and through the windings 18 and 16. Since the currents flowing through the windings 18 and 20 have characteristics corresponding to the currents flowing through the windings 14 and 16, equal volt-seconds are introduced to the cores 10 and 12 from the source 24. This would cause both of the cores 10 and 12 to saturate at substantially the same time in the half cycles when no signal is produced by the source 32. The cores 10 and 12 would saturate at the same time in the half cycles if a sufficient amount of volt-seconds were to be introduced to the cores from the source 24. Otherwise, neither of the cores 10 and 12 would saturate in the half cycles of voltage from the source 24.

Actually, however, it would probably be desirable to prevent the cores 10 and 12 from saturating in the half cycles of line voltage, as indicated at 51 and 53 in Figures 3*c* and 3*d* for the windings on the cores. This may be accomplished by having adequate volt-second capacity in the windings 14, 16, 18 and 20, and by obtaining a flow of bias current downwardly through the winding 30 and upwardly through the winding 28 in Figure 1. The operation of this current in preventing saturation will be more readily understood from the subsequent discussion.

Upon the introduction of a signal from the source 32, current flows through a circuit including the source and the windings 28 and 30. When a positive signal is produced in the source 32 as represented by a relatively high voltage on the upper terminal of the source in Figure 1, and as indicated at 52 in Figure 3*b*, current flows downwardly through the winding 28 and upwardly through the winding 30. The current flowing through the winding 28 causes volt-seconds to be introduced to the core 10 in the same direction as the volt-seconds applied to the core by the flow of line current through the windings 14 and 16. However, energy is introduced to the core 12 by the flow of current through the winding 30 in a direction opposite to the energy applied to the core by the flow of line current through the windings 18 and 20. This produces a temporal separation in the saturation of the cores 10 and 12 and causes the core 10 to saturate before the core 12 in the positive half cycles of line voltage from the source 24.

The saturation of the core 10 causes the impedance presented to the windings 14 and 16 to become relatively low in a manner similar to that described above. It also causes the voltage developed across the windings 14 and 16 to become negligible, as indicated at 54 in Figure 3*c*. Because of the low impedances presented to the windings 14 and 16, a relatively large current flows through a circuit including the source 24, the winding 14, the diode 22, the winding 16 and the load 26. This current is limited substantially only by the value of the load 26 because of the low copper resistances of the windings 14 and 16 and the low impedance of the diode 22 in the forward direction. Since a relatively large current flows through the load 26, a large amount of power is developed in the load for use in subsequent stages.

During the flow of load current through a circuit including the winding 14, the diode 22 and the winding 16, the winding 18 is connected in parallel with the series branch formed by the winding 14 and the diode. Since the winding 14 and the diode 22 have low impedances, the winding 18 is essentially short-circuited so that no current can flow through the winding. This is indicated at 56 in Figure 3*d*. At the time that the winding 18 becomes short circuited, only an amount of volt-seconds indicated at 58 in Figure 2 has been introduced to the core 12. As a result of the short-circuiting of the winding 18, the volt-seconds in the core 12 remain at a level near the position 58 during the remainder of the positive half cycle from the source 24.

Actually, when the core 10 becomes saturated, a relatively low voltage is produced across the winding 18 because of the copper resistance in the winding 14 and the low forward impedance in the diode 22. The low voltage across the winding 18 causes a relatively small current to flow through the winding during the remainder of the half cycle of positive voltage from the source 24 after the core 10 has saturated. This low flow of current introduces a small amount of volt-seconds to the core 12 and contributes to a change in the volt-seconds in the core at the end of the half cycle to a level indicated at 60 in Figure 2. The level 60 is below the saturating level 44 so that the core 12 remains unsaturated. The winding 20 becomes essentially short-circuited at substantially the same instant of time in the half cycles of positive line voltage that the winding 18 becomes short-circuited. This results from the fact that the winding 20 is connected across the series branch formed by the diode 22 and the winding 16. At the time that the winding 20 becomes essentially short-circuited volt-seconds having the level 58 in Figure 2 have been introduced to the core 12. However, because of the low impedances in the diode 22 and the winding 16, current having a low amplitude flows through the winding 20 and contributes toward changing the level of volt-seconds in the core 12 from the value 58 to the value 60 in Figure 2.

As will be seen, the core 12 is inhibited from becoming saturated after the core 10 has become saturated. This is especially true when the diode 22 has a low forward impedance and when the windings 14 and 16 have low copper resistances. Since the core 12 does not saturate during the remainder of the positive half cycles of line voltage after the saturation of the core 10, a large current flows through the load 26 during the remainder of the positive half cycle. This large current produces a large voltage across the load as indicated at 62 in Figure 3*e* and causes a considerable amount of power to be developed in the load.

In the next half cycle of line voltage from the source 24, a negative voltage is developed on the ungrounded terminal of the source as indicated at 64 in Figure 3*a*. This negative voltage produces a flow of magnetizing current upwardly through the windings 16 and 18 and through the windings 20 and 14. The flow of current is in a direction to produce a negative saturation of flux in the cores corresponding to that indicated at 46 in Figure 2. The flux produced in the core 12 by the upward flow of current through the windings 18 and 20 is in the same direction as the flux produced in the core by the flow of current through the winding 30 for a positive signal such as that indicated at 52 in Figure 3*b*. However, the flux produced in the core 10 by the flow of current through the windings 14 and 16 is in an opposite direction to that produced by the flow of current through the winding 28. This produces a temporal separation in the saturation of the cores 10 and 12 and causes the core 12 to saturate before the core 10.

The separation in the saturation of the cores 10 and 12 is also facilitated by the initial separation in the core intensities at the beginning of the negative half cycle of line voltage from the source 24. This may be seen from the fact that the flux in the core 12 has to change only from the level 60 to the level 46 in the negative half cycle in order to produce saturating flux of negative polarity in the core. However, the flux in the core 10 would have to change from a saturating intensity of positive flux such as that indicated at 44 in Figure 2 to a negative intensity of saturating flux such as that indicated at 46 in Figure 2.

Upon the saturation of the core 12, the impedance presented to the windings 18 and 20 becomes relatively low. This causes a relatively large current to flow through a circuit including the load 26, the winding 20, the diode 22, the winding 18 and the source 24. The current has a large intensity since it is limited essentially only by the value of the load 26. The current flowing through the load 26 produces a relatively large voltage indicated at 66 across the load. When current flows through the above circuit, it causes the winding 16 to become essentially short-circuited since it is connected across the series branch formed by the winding 20 and the diode 22. Similarly, the winding 14 becomes essentially short-circuited because of its connection across the series branch formed by the diode 22 and the winding 18.

Since the windings 14 and 16 are essentially short-circuited, the volt-seconds level in the core 10 continues during the remainder of the negative half cycle of line voltage at a substantially constant level such as that indicated at 68 in Figure 2. Actually, the volt-seconds level may change from the value 68 to a value 70 because of a slight flow of current through the windings 14 and 16. This slight flow of current would be produced as a result of the copper resistance in the windings 18 and 20 and a slight forward impedance produced in the diode 22.

It will be seen that an output signal is produced in each half cycle of line voltage from the source 24 when the input signal from the source 32 has a particular polarity. This polarity is represented by a relatively high voltage on the upper terminal of the source 32 in Figure 1 and a relatively low voltage on the lower terminal of the source and is indicated at 52 in Figure 3*b*. Upon the occurrence of the particular polarity of input signal, an output signal is produced which has a positive polarity in the positive half cycles of line voltage and a negative polarity in the negative half cycles of line voltage. This is indicated at 62 and 66 in Figure 3*e*. However, when the input signal has a polarity opposite to the particular polarity, no output signals are produced across the load 26 in either the positive or negative half cycles of line voltage.

As has been previously described, one of the cores 10 and 12 remains unsaturated in each half cycle of line voltage even upon the production of an output signal across the load 26. Since one of the cores remains unsaturated, the magnetic amplifier shown in Figure 1 can be considered to operate as a memory device. This results from the fact that the volt-seconds level of the unsaturated core at the end of each half cycle is dependent upon the magnitude of the input signal from the source 32. When the input signal is relatively weak, the volt-seconds level in the unsaturated core approaches saturation at the end of the half cycle of line voltage. For relatively strong signals from the source 32, the volt-seconds level in the unsaturated core is somewhat removed from the saturation level. This in turn influences the time in the next half cycle at which the unsaturated core becomes saturated.

The amount of memory provided in the magnetic amplifier shown in Figure 1 and described above is also dependent upon the value of the load 26. For example, when the load 26 has a high impedance, the memory characteristics of the amplifier are improved. This results from the fact that the forward impedance of the diode 22 and the copper resistance of the windings associated with the saturated core are relatively low in comparison to the value of the load. Since the load has a relatively high impedance, most of the line voltage would be developed across the load and very little of the voltage would be developed across the windings associated with the saturated core. This would facilitate the short circuiting of the windings associated with the unsaturated core.

The magnetic amplifier shown in Figure 1 is also advantageous because of its high efficiency of operation. The magnetic amplifier is highly efficient because most of the line voltage is developed across the load, especially when the load has a relatively high impedance and the copper resistances of the windings are low. Since relatively little voltage is developed across the windings upon the saturation of one of the cores, very little power is consumed in the windings. This causes most of the power from the source 24 of line voltage to be made available to the load 26.

Figure 4 illustrates a modified form of the magnetic amplifier shown in Figure 1 and described above. The modified form of the invention includes a pair of cores 74 and 76 corresponding to the cores 10 and 12 in Figure 1. A pair of windings 78 and 79 are magnetically coupled to the core 74 in a manner similar to the association between the windings 14 and 16 and the core 10 in Figure 1. In like manner, a pair of windings 80 and 81 are disposed in magnetic proximity to the core 76. The windings 80 and 81 correspond to the windings 18 and 20 in Figure 1.

The windings 78, 79, 80 and 81 are included in a bridge arrangement with a plurality of diodes 82, 83, 84 and 85. The windings 78 and 80 are respectively connected to the plate of the diode 82 and the cathode of the diode 84. The cathode of the diode 82 and the plate of the diode 84 have a common connection with each other and with the plate of the diode 83 and the cathode of the diode 85. Connections are respectively made from first terminals of the windings 79 and 81 to the cathode of the diode 83 and the plate of the diode 85.

The other terminals of the windings 79 and 81 are connected to one terminal of a resistance 86 having its other terminal grounded and corresponding in value to the resistance 26 in Figure 1. The resistance 86 and the bridge formed by the windings and diodes are in series with a source 87 of line voltage corresponding to the source 24 in Figure 1. One terminal of the source 87 may be grounded.

A pair of windings 88 and 89 are respectively coupled magnetically to the cores 74 and 76 and are electrically disposed in a differential relationship with respect to each other. The windings 88 and 89 correspond to the windings 28 and 30 in Figure 1. The windings 88 and 89 are in series with a source 90 of signal voltage and a load 91 respectively corresponding to the source 32 and the load 31 in Figure 1.

In the negative half cycles of line voltage from the source 87, the core 76 becomes saturated when the source 90 is producing a positive signal. This causes current to flow through a circuit including the resistance 86, the winding 81, the diode 85, the diode 84, the winding 80 and the source 87. The current flows upwardly through the windings 81 and 80 in Figure 4 in a manner similar to that described above for the magnetic amplifier shown in Figure 1.

When a strong signal of positive polarity is produced in the source 90 in the next half cycle of line voltage from the source 87, a large current flows downwardly through the windings 78 and 79. The currents from the sources 87 and 90 p roduce fluxes of the same polarity in the core 74 and cause the flux in the core to change rapidly. Because of the considerable change in flux in the core 74, relatively large voltages are induced in the windings 78 and 79. When the signal from the source 90 is sufficiently large, the voltages induced in the windings 78 and 79 may equal or even exceed the voltage from the source 87.

Because of the inclusion of the diodes 84 and 85, current is not able to flow through the windings 80 and 81 in the positive half cycles of voltage from the source 87. Since current is not able to flow through the windings 80 and 81, the windings 78 and 79 receive most of the voltage from the source 87. By applying most of the voltage from the source 87 to the windings 78 and 79, the core 74 is made to saturate at an early time in the positive half cycles. This time may be earlier than the time at which the cores shown in Figure 1 can be made to saturate. In this way, maximum power is made available to the load 86.

Although current is not able to flow through the windings 80 and 81 in the positive half cycles of voltage from the source 87, the core 76 still receives flux for changing its flux level from a state of negative saturation. This results from the fact that a voltage is induced in the winding 88 during at least that portion of the cycle in which the core 76 is not saturated. This voltage is in a direction to produce a positive voltage on the upper terminal of the winding 88 in Figure 4.

The voltage induced in the winding 88 tends to produce a flow of current in a downward direction in Figure 4 so as to obtain the formation of a positive flux in the core 76. In this way, the core 76 becomes set in the positive half cycles to a level such as that indicated at 60 in Figure 2 so that it can receive at least a moderate amount of volt-seconds in the negative half cycles before it becomes saturated.

In like manner, in the negative half cycles of voltage from the source 87, the diodes 82 and 83 block the flow of current from the source. For a heavy signal of positive polarity from the source 90, this causes the core 76 to saturate at early times in the half cycles. In this way, a large current is delivered to the load 86 at an early time in the half cycles.

During the negative half cycles of line voltage from the source 87, a voltage is induced in the winding 89 before the saturation of the core 76 with flux of a negative polarity. This voltage tends to produce a flow of current through the winding 88 in a direction for converting the flux in the core 76 from a level of positive saturation. This sets the core 76 for proper operation in the positive half cycles of voltage from the source 87.

The embodiment shown in Figure 5 includes a plurality of bridges similar to that shown in Figure 1 and described above. For example, a bridge generally indicated at 100 includes a pair of cores 102 and 104 corresponding to the cores 10 and 12 in Figure 1. The core 102 is indicated in solid lines and the core 104 is indicated in broken lines. Windings 106 and 108 are wound on the core 102 and the windings 110 and 112 are wound on the core 104. The windings 106, 108, 110 and 112 respectively correspond to the windings 14, 16, 18 and 20 in Figure 1. The windings 106, 108, 110 and 112 are connected in a bridge arrangement in a manner similar to that described above and a diode 114 is connected between opposite terminals of the bridge.

The saturable properties of the cores 102 and 104 also control the operation of a bridge generally indicated at 120. This results from the fact that windings 122 and 124 are magnetically coupled to the core 102 and windings 126 and 128 are magnetically coupled to the core 104. The windings 122, 124, 126 and 128 have characteristics corresponding respectively to the windings 106, 108, 110 and 112. The windings 122, 124, 126 and 128 are connected in a bridge arrangement in a manner similar to the windings 106, 108, 110 and 112. A diode 130 corresponding to the diode 114 is connected between opposite terminals of the bridge 120 formed by the windings 122, 124, 126 and 128.

In like manner, a third bridge generally indicated at 132 is formed from a plurality of windings 134, 136, 138 and 140. The windings 134 and 136 are magnetically associated with a core 142 having characteristics corresponding to those of the core 102, and the windings 138 and 140 are associated with a core 144 having characteristics corresponding to those of the core 104. The windings 134, 136, 138 and 140 are provided with characteristics corresponding to the characteristics of the windings 106, 108, 110 and 112 and are connected in an arrangement similar to that provided for the latter windings. A diode 146 corresponding to the diode 114 is connected to opposite terminals of the bridge 132 formed by the windings 134, 136, 138 and 140.

The fourth bridge generally indicated at 150 is formed from a plurality of windings 152, 154, 156 and 158. The windings 152 and 154 are disposed in magnetic proximity to the core 142 and the windings 156 and 158 are disposed in magnetic proximity to the core 144. The windings 152, 154, 156 and 158 are provided with characteristics corresponding to the characteristics of the windings 134, 136, 138 and 140 and are connected in a bridge relationship similar to that described above for the latter windings. A diode 160 corresponding to the diode 114 is connected to opposite terminals of the bridge.

A source 162 of alternating line voltage is connected at one end to the terminal in the bridge network 100 defined by the common connection between the windings 106 and 110 and is also connected to the terminal in the bridge network 132 defined by the common connection between the windings 134 and 138. The source 162 may correspond to the source 24 in Figure 1 and may have its second terminal grounded. Connections are made from one end of a load 164 such as a resistance to the terminal in the bridge 100 defined by the electrical junction between the windings 108 and 112 and to the terminal in the bridge 150 defined by the electrical junction between the windings 152 and 156. The other end of the load 164 has a common connection with the terminal in the bridge 132 defined by the electrical junction between the windings 136 and 140 and to the terminal in the bridge 120 defined by the electrical junction between the windings 122 and 126. The terminal in the bridge 150 defined by the electrical connection between the windings 154 and 158 is grounded, as is the terminal in the bridge 120 defined by the electrical connection between the windings 124 and 128.

Input windings are also magnetically coupled to each of the cores 102, 104, 142 and 144. The input winding disposed on the cores 102, 104, 142 and 144 are respectively indicated at 170, 172, 174 and 176. The windings 170, 172, 174 and 176 are provided with characteristics corresponding to those of the windings 28 and 30 in Figure 1. The windings 170 and 172 are adapted to introduce volt-seconds on a differential basis to the cores 102 and 104. This differential operation is obtained as by connecting the lower terminals of the windings 170 and 172 in Figure 5. Similarly, a differential operation of the windings 174 and 176 is obtained by connecting the lower terminals of the windings in Figure 5.

The upper terminal of the winding 170 is connected to one terminal of a signal source 180 corresponding to the source 32 in Figure 1. The source 180 is shown as providing signals of alternating polarity but it should be appreciated that the source 180 may also provide signals of direct polarity. Preferably, the signal from the source 180 is of direct polarity. A resistance 182 is connected between the second terminal of the source 180 and the upper terminal of the winding 174 in Figure 5. The upper terminals of the windings 172 and 176 have a common connection.

During the positive half cycles of line voltage from the source 162, magnetizing current flows downwardly through all of the windings in the bridges 100, 120, 132 and 150. This causes the cores 102, 104, 142 and 144 to receive volt-seconds of substantially equal magnitude from the source 162. Upon the simultaneous introduction of a positive signal from the source 180, current flows downwardly through the windings 170 and 176 and upwardly through the windings 172 and 174. This causes the source 180 to introduce volt-seconds to the core 102 in the same direction as the volt-seconds introduced by the line current from the source 162. However, the volt-seconds introduced from the source 180 to the core 104 oppose the volt-seconds produced in the cores by the current flowing through the line windings from the source 162. A resultant separation in the saturation of the cores 102 and 104 is obtained.

Upon the saturation of the core 102 in the positive half cycles of line voltage from the source 162, the impedance presented by the windings 106, 108, 122 and 124 becomes relatively low. Because of these low impedances, a relatively large current flows through a circuit including the source 162, the winding 106, the diode 114, the winding 108, the load 164, the winding 122, the diode 130 and the winding 124. The current flowing through this circuit is limited almost entirely by the value of the load 164 since the impedance of the load is considerably in excess of the copper resistance in the windings 106, 108, 122 and 124 and considerably greater than the forward impedances of the diodes 114 and 130. The current flowing through the load 164 continues during the remainder of the half cycle of line voltage because of the short-circuiting action provided for the windings 110, 112, 126 and 128 disposed on the core 104. This short-circuiting action prevents current of any appreciable magnitude from flowing through the windings 110, 112, 126 and 128 such that the core 104 cannot become saturated during the remainder of the half cycle of line voltage.

As previously described, current flows downwardly through the winding 176 and upwardly through the winding 174 when the voltage from the source 180 has a positive polarity. Since current also flows downwardly through the windings 152, 154, 156 and 158 and through the windings 134, 136, 138 and 140 in the positive half cycles of voltage from the source 162, it might be expected that the core 144 would saturate before the core 142 in these half cycles. This temporal separation in the saturation of the cores 142 and 144 is prevented by the diodes 160 and 146. Since the diodes 160 and 146 perform similar functions, the action of only the diode 160 will be explained.

Since the core 144 is theoretically receiving more volt-seconds than the core 142 during positive voltages from the sources 162 and 180, the voltage induced in the winding 158 will exceed the voltage induced in the winding 154. This will cause current to flow through a circuit including the winding 158, the diode 160 and the winding 154. The current flows downwardly through the winding 154 and upwardly through the winding 158. Because of this current, the volt-seconds introduced to the core 142 would tend to increase and the volt-seconds introduced to the core 144 would tend to decrease. This would cause the volt-seconds introduced to the cores 142 and 144 to become substantially equal. It would also prevent either of the cores 142 or 144 from saturating before the core 102 or from saturating during the remainder of the half cycle after the core 102 has saturated.

In the negative half cycles of line voltage from the source 162, the core 104 receives volt-seconds in the same direction from the line voltage as from the source 180 for a positive signal from the source 180. However, the volt-seconds introduced to the core 102 from the source 180 are in an opposite direction to the volt-seconds introduced to the core from the source 162 of line voltage. This produces a temporal separation in the saturation of the cores 102 and 104, such that the core 104 saturates before the core 102.

Upon the saturation of the core 104, the impedance presented by the windings 110, 112, 126 and 128 becomes relatively low. This causes a relatively large current to flow through a circuit including the winding 128, the diode 130, the winding 126, the load 164, the winding 112, the diode 114, the winding 110 and the source 162. The current flows toward the left through the load 164 in Figure 5 and has an amplitude limited substantially only by the value of the load.

In the negative half cycles of voltage from the source 162, the volt-seconds introduced to the core 142 from the source 162 are in the same direction as the volt-seconds introduced to the core from the source 180. This causes relatively large voltages to be induced in the windings 154, 152, 136 and 134. The voltages cause currents to flow through a circuit including the winding 152, the diode 160 and the winding 156 and through a circuit including the winding 134, the diode 146 and the winding 138. The currents flow through the windings 134 and 152 in a direction opposite to the introduction of volt-seconds to the windings and thereby prevent the saturation of the core 142 during the half cycles.

A negative signal from the source 180 produces a downward flow of current through the windings 174 and 172 and an upward flow of current through the windings 176 and 170. In the positive half cycles of voltage from the source 162, the current from the sources 162 and 180 would cause volt-seconds of the same polarity to be introduced to the cores 104 and 142 and volt-seconds of opposite polarities to be introduced to the cores 102 and 144. This differential introduction of volt-seconds to the cores 142 and 144 would produce a saturation of the core 142 before the core 144.

When the core 142 saturates, current flows through a circuit including the source 162, the winding 134, the diode 146, the winding 136, the load 164, the winding 152, the diode 160 and the winding 154. This current flows toward the left through the load 164 in Figure 5 and has an amplitude limited essentially only by the impedance of the load.

During the introduction of positive voltage from the source 162 and negative voltage from the source 180, the core 104 cannot become saturated even though it receives volt-seconds of the same polarity from both sources. This results from the circulation of current through a circuit including the winding 112, the diode 114 and the winding 108 and through a circuit including the winding 128, the diode 130 and the winding 124. The core 104 cannot saturate since the current flowing through the above circuits produces flux in a direction opposite to that produced in the core by the flow of current from the sources 162 and 180.

In the negative half cycles of line voltage from the source 162, the core 144 saturates before the core 142 for a negative signal from the source 180. The saturation of the core 144 causes current to flow through a circuit including the winding 158, the diode 160, the winding 156, the load 164, the winding 140, the diode 146, the winding 138 and the source 162. This current flows toward the right through the load 164 in Figure 5.

As will be seen from the above discussion, a relatively large current flows through the load 164 in each half cycle of line voltage from the source 162. The flow of current is produced in each half cycle of line voltage regardless of the polarity of the signal from the source 180. For a direct signal from the source 180, the current flows in alternate directions through the load 164 in each half cycle of line voltage from the source 162. This causes an alternating output signal of amplified intensity to be produced across the resistance 164 upon the introduction of a direct input signal from the source 180.

It should be appreciated that the windings 122 and 124, the windings 126 and 128, the windings 152 and 154 and the windings 156 and 158 can be respectively wound on different cores than the cores 102, 104, 142 and 144. These windings can be wound on different cores provided that the different cores have characteristics corresponding to the characteristics of the cores 102, 104, 142 and 144. In this way, corresponding cores in the bridges 100 and 120 and in the bridges 132 and 150 would saturate at the proper time.

The modification shown in Figure 6 includes the bridge arrangement shown in Figure 5 but also includes a plurality of additional windings to supply additional power to the load. For example, windings 200 and 202, windings 204 and 206, windings 208 and 210 and windings 212 and 214 are respectively associated with the cores 102, 104, 142 and 144. The windings 200, 202, 204, 206, 208, 210, 212 and 214 are provided with similar characteristics. Each of these windings is provided with characteristics bearing a particular relationship to the line windings such as the windings 106, 108, 110 and 112. For example, each of the windings 200, 202, 204, 206, 208, 210, 212 and 214 may have approximately one fourth as many turns as the line windings such as the windings 106, 108, 110 and 112.

The bridges 100, 120, 132 and 150 are connected to each other and to the load 164 in a different arrangement from that shown in Figure 5. For example, the windings 200 and 204 are in series with each other between one terminal of the load 164 and the terminal in the bridge 150 defined by the common junction between the windings 152 and 156. The windings 200 and 204 are connected to produce volt-seconds in the cores 102 and 104 in a direction opposite to the volt-seconds respectively produced in the cores by the windings 106 and 108 and by the windings 110 and 112.

Similarly, the windings 202 and 206 are connected in a series arrangement to produce volt-seconds in the cores 102 and 104 in a direction opposite to the volt-seconds respectively produced in the cores by the windings 122 and 124 and by the windings 126 and 128. This is obtained by connecting the windings 202 and 206 between the second terminal of the load 164 and the terminal in the bridge 132 defined by the common junction between the windings 136 and 140.

The windings 202 and 206 and the windings 208 and 212 are in series between the bridges 120 and 132. The winding 208 has a common connection at one end with the terminal in the bridge 120 defined by the junction between the windings 122 and 126. At the other end of the series circuit formed by the windings 202, 206, 208 and 212, the winding 206 has a common connection with the terminal in the bridge 132 defined by the common junction between the windings 136 and 140. The series relationship of the windings 208 and 212 is arranged so that the windings introduce energy to the cores 142 and 144 in an opposite polarity to the energy respectively introduced to the cores from the windings 134 and 136 and the windings 138 and 140.

In like manner, the windings 200 and 204 and the windings 210 and 214 are in series between the bridges 100 and 150. A connection is made from the winding 200 to the terminal in the bridge 150 defined by the common junction between the windings 152 and 156.

At the other end of the series arrangement, the winding 214 is connected to the terminal in the bridge 100 defined by the junction between the windings 108 and 112. The windings 210 and 214 are connected in the series circuit to introduce volt-seconds to the cores 142 and 144 on an opposite basis relative to the introduction of volt-seconds respectively from the windings 152 and 154 and the windings 156 and 158.

When the core 102 saturates in the positive half cycles of voltage from the source 162, current flows downwardly in Figure 6 through a circuit including the source, the winding 106, the diode 114, the winding 108, the windings 214 and 210, the load 164, the windings 212 and 208, the winding 122, the diode 130 and the winding 124. All of the windings in the above circuit except the windings 210, 214, 208 and 212 present low impedances to the flow of current because of the saturation of the core 102 as described fully above in connection with the embodiment shown in Figure 5.

As may be seen from the embodiment shown in Figure 5, substantially all of the voltage from the source 162 is developed across the bridge 150 when the core 102 saturates in the positive half cycles of voltage from the source 162 and when the source 180 produces a positive voltage. This results from the fact that the bridges 100 and 150 are connected to each other and the current flow through the winding 106, the diode 114 and the winding 108 produces no voltage drop because of the low impedances in these windings.

In the embodiment shown in Figure 6, the windings 210, 214, 204 and 200 are in series between the bridges 100 and 150. This causes voltage to be developed across the windings 214 and 210 since the cores 142 and 144 respectively associated with these windings remain unsaturated even after the core 102 has become saturated. The voltages developed across the windings 214 and 210 are in an opposite direction to the voltages produced in the windings 152 and 154 and in the windings 156 and 158. This results from the differential relationship between the winding 214 and the windings 152 and 154 and between the winding 210 and the windings 156 and 158.

Since the voltages developed across the windings 214 and 210 have an opposite polarity to the voltages developed across the windings 152 and 154 and across the windings 156 and 158, the following relationship is obtained:

$$V_L = V_1 - KV_1 \qquad (1)$$

where $V_L$=the voltage from the source 162;

$V_1$=the voltage developed across each of the windings 152, 154, 156 and 158; and $K$=the proportionate relationship between the characteristics of the windings 214 and 210 and each of the windings 152, 154, 156 and 158, a value of $K=\frac{1}{4}$ being representative.

Transposing the terms in Equation 1, $$V_1 = V_L + KV_1 \qquad (2)$$

As will be seen from Equation 2, the voltage developer across each of the line windings 152, 154, 156 and 158 is greater than the line voltage from the source 162. This causes a voltage greater than line voltage to be introduced to the left terminal of the load 164 in Figure 6.

In like manner, a voltage greater than the line voltage from the source 142 is developed across each of the windings 134, 136, 138 and 140. This results from the fact that the windings 134, 136, 138 and 140 are provided with characteristics similar to the characteristics of the windings 152, 154, 156 and 158 and are wound on the cores 142 and 144 with the windings 152, 154, 156 and 158. Since each of the windings 134, 136, 138 and 140 has a voltage greater than the line voltage from the source 162, a negative voltage is produced at the terminal in the bridge 132 defined by the junction between the windings 136 and 140. This negative voltage is introduced through the windings 206 and 202 to the right terminal of the load 164 in Figure 6.

As has been described above, a positive voltage greater than the line voltage is introduced to the left terminal of the load 164 in Figure 6 and a negative voltage is introduced to the right terminal of the load. This causes a voltage considerably in excess of the line voltage from the source 162 to be developed across the load 164. Such increases in the output voltage may sometimes be desired without any increase in the line voltage from the source 162.

The above description has proceeded on the basis of a positive half cycle of line voltage from the source 162 and a positive signal from the source 180. It can also be shown that a considerable increase in voltage is obtained across the load 164 in the negative half cycles of line voltage for a positive signal from the source 180. Considerable increases in voltage across the load 164 are also obtained in every half cycle of line voltage from the source 162 for a negative signal from the source 180.

We claim:

1. A magnetic amplifier, including, a first saturable core, a second saturable core, a first pair of windings magnetically coupled to the first core, a second pair of windings magnetically coupled to the second core, means for introducing cyclic line voltage to the windings to produce core saturations, the windings in the first and second pairs being connected in a bridge circuit in which the windings in each pair define opposite legs of the bridge, means for introducing signal energy differentially to the cores to produce a saturation of one of the cores before any saturation of the other core, a load connected to one terminal of the bridge to receive an output current upon a saturation of one of the cores in the half cycles and until the end of the half cycles, and a unidirectional member connected between opposite terminals of the bridge and connected to a different terminal than that connected to the load to provide a flow of load current through the windings in one of the pairs upon the saturation of the associated core and to provide a short-circuiting action on the windings in the other pair for preventing the core associated with the other pair of windings from saturating.

2. A magnetic amplifier, including, a first saturable core, a second saturable core, a first pair of windings magnetically coupled to the first core, a second pair of windings magnetically coupled to the second core, the windings in the first and second pairs being connected in a bridge circuit having first and second pairs of opposite terminals, the windings in each pair of defining opposite legs in the bridge, a unidirectional member connected between the first pair of opposite terminals to provide for a flow of current through one of the pairs of windings upon the saturation of the associated core and to limit the flow of current through the other pair of windings and inhibit the saturation of the core associated with the other pair of windings, means for providing for the introduction of alternating line voltage between the second pair of terminals in the bridge, means for introducing signal energy to the windings in each pair and on a differential basis to the pairs of windings relative to the introduction of line voltage to the pairs of windings to produce a saturation of one of the cores before any saturation of the other core, and a load connected between the voltage source and one of the terminals in the second pair for producing power amplification of the signal energy upon the saturation of one of the cores in the half cycles and until the end of the half cycles.

3. A magnetic amplifier, including, a first saturable core, a second saturable core, first and second windings disposed in magnetic proximity to the first core, third and fourth windings disposed in magnetic proximity to the second core, the first, second, third and fourth windings being connected in a bridge arrangement with opposite legs of the bridge being defined by the first and second windings and by the third and fourth windings, a unidirectional member being connected at one end to the first and fourth windings and at its opposite end to the second and third windings to provide a continuous path for the flow of current through the first and second windings or through the third and fourth windings and to provide a communication between the first and third windings and between the second and fourth windings for inhibiting the saturation of one of the cores upon the saturation of the other core, means for providing an alternating line voltage and for applying the voltage between the first and third windings and between the second and fourth windings to provide core saturations in successive half cycles of line voltage, means for introducing signals differentially to the cores relative to the introduction of the line voltage to produce a saturation of one of the cores before any saturation of the other core, and a load connected between the second and fourth windings at one end and the voltage means at the other end for producing signal amplification in the half cycles of line voltage upon a saturation of one of the cores and until the end of the half cycles.

4. A magnetic amplifier, including, a plurality of saturable cores grouped into pairs, a plurality of windings disposed in pairs, each pair of windings being coupled magnetically to a different core, the windings in each pair being connected to the windings in a different pair to form a plurality of bridge circuits, means for applying alternating line voltage to the windings to produce core saturations initially in one direction and then in the opposite direction in the successive half cycles of line voltage, means for introducing signal voltages differentially to a first pair of windings in each bridge circuit relative to the introduction of signal voltages to the other pair of windings in the bridge circuit and relative to the introduction of the alternating line voltage to the windings in the bridge circuit to produce a saturation of one core associated with the bridge circuit before any saturation of the other core associated with the bridge circuit, a plurality of unidirectional members each connected to the windings in a different bridge circuit to provide a low impedance path for the flow of load current from the line voltage means upon the saturation of one of the cores in the bridge circuit and to inhibit the saturation of the other core in the bridge circuit during the remainder of the half cycle of line voltage, and a load connected between the different bridge circuits to receive the flow of load current in each half cycle of line voltage and regardless of the polarity of the signal voltage.

5. A magnetic amplifier, including, a first saturable core, a second saturable core, a first pair of windings magnetically coupled to the first core, a second pair of windings magnetically coupled to the second core and connected to the first pair of windings to form a first bridge circuit, a second bridge circuit including cores and windings associated with one another in a manner similar to the association of the cores and windings in the first bridge circuit, a third bridge circuit including cores and windings associated with one another in a manner similar to the association of the cores and windings in the first bridge circuit, a fourth bridge circuit including cores and windings associated with one another in a manner similar to the association of the cores and windings in the first bridge circuit, means for applying alternating line voltage to the windings in each bridge circuit to produce core saturations initially in one direction and then in the other in the successive half cycles, means for producing a temporal separation in the saturation of the cores in each bridge circuit during each half cycle of line voltage including means for exposing the cores to flux produced by a signal current, a plurality of unidirectional means each connected in a different bridge circuit to provide for a flow of load current through the windings in a pair in the bridge circuit upon the saturation of the associated core and to limit the flow of current through the other pair of windings in the bridge circuit during the remainder of the half cycle of line voltage for the prevention of any saturation of the core associated with the other pair of windings, and a load connected to the first, second, third and fourth bridge circuits to receive the flow of load current in each half cycle of line voltage and regardless of the polarity of the signal current.

6. A magnetic amplifier, including, a first saturable core, a second saturable core, first and second windings disposed in magnetic proximity to the first core, third and fourth windings disposed in magnetic proximity to the second core, the first, second, third and fourth windings being connected in a first bridge circuit with opposite legs of the bridge being defined by the first and second windings and by the third and fourth windings, a unidirectional member being connected at one end to the first and fourth windings and at its opposite end to the second and third windings to provide a continuous path for the flow of current through the first and second windings or through the third and fourth windings and to provide a communication between the first and third windings and between the second and fourth windings for inhibiting the saturation of one of the cores upon the saturation of the other core, a second bridge including cores, windings and a unidirectional member disposed in an arrangement similar to that recited above for the first bridge, a third bridge including cores, windings and a unidirectional member disposed in an arrangement similar to that recited above for the first bridge, a fourth bridge including cores, windings and a unidirectional member disposed in an arrangement similar to that recited above for the first bridge, means for providing an alternating line voltage and for applying the voltage between the first and third windings and between the second and fourth windings in each bridge to provide core saturations in successive half cycles of line voltage, means for introducing signals differentially to the cores in each bridge relative to the introduction of the line voltage to produce a saturation of one of the cores in the bridge before any saturation of the other core in the bridge, and a load connected to the first, second, third and fourth bridges to receive load current in each half cycle of line voltage regardless of the polarity of the signals.

7. A magnetic amplifier as set forth in claim 4, including, a second plurality of windings each coupled to a different one of the cores in the plurality on a differential basis relative to the windings in the first plurality and connected to the load to produce an increase in the power delivered to the load.

8. A magnetic amplifier as set forth in claim 6, including, a fifth winding disposed in magnetic proximity to the first core, a sixth winding disposed in magnetic proximity to the second core, the fifth and sixth windings being connected in series between the load and a particular one of the bridges on a differential basis relative to the first, second, third and fourth windings, and corresponding windings disposed in magnetic proximity to the cores in the second, third and fourth bridges and connected between the load and a particular bridge on a differential basis to the windings disposed in magnetic proximity to their associated core, the fifth and sixth windings in the first bridge and the corresponding windings in the other bridges being connected to the load to provide an increase in power delivered to the load.

9. A magnetic amplifier, including, a first saturable core, a second saturable core, a first pair of windings disposed in magnetic proximity to the first core, a second pair of windings disposed in magnetic proximity to the second core with the same polarity as the first pair of windings, a third pair of windings each magnetically coupled to a different one of the cores on a differential basis relative to the magnetic disposition of the first pair of windings with respect to the first core and relative to the magnetic disposition of the second pair of windings with respect to the second core, means having a first terminal grounded and having a second terminal connected to first terminals of first windings in the first and second pairs for applying alternating line voltage to the windings to produce core saturations initially in one direction and then in the opposite direction in successive half cycles of the line voltage, means connected in a series relationship with the windings in the third pair to apply signals to the windings on a differential basis relative to the introduction of line voltage to obtain a separation in the saturation of the cores in each half cycle of the line voltage, a load having a first terminal grounded and having a second terminal connected to the second terminals of the second windings in the first and second pairs, and unidirectional means connected in the bridge to the second terminals of the first windings in the first and second pairs and to the first terminals of the second windings in the first and second pairs to provide for a flow of output current through the load upon a saturation of one of the cores in the half cycles and to prevent the other core from saturating during the remainder of the half cycles.

10. A magnetic amplifier as set forth in claim 9 in which a diode having a plate and a cathode serves as the unidirectional means and in which the plate of the diode is connected to the second terminal of the first winding in the first pair and to the first terminal of the second winding in the second pair and in which the cathode of the diode is connected to the second terminal of the first winding in the second pair and to the first terminal of the second winding in the first pair.

11. A magnetic amplifier, including, a first saturable core, a second saturable core, a first pair of windings magnetically coupled to the first core, a second pair of windings magnetically coupled to the second core with the same polarity as the windings magnetically coupled to the first core, a third pair of windings each magnetically coupled to a different one of the cores on a differential basis relative to the magnetic coupling of the first pair of windings to the first core and the second pair of windings to the second core, means having a first terminal grounded and having a second terminal connected to first terminals of first windings in the first and second pairs for applying alternating line voltage to the windings to produce core saturations initially in one direction and then in the opposite direction in successive half cycles of the line voltage, means connected in a series relationship with the windings in the third pair to apply signals to the windings on a differential basis relative to the introduction of line voltage to obtain a separation in the saturation of the cores in each half cycle of the line voltage, a load having a first terminal grounded and having a second terminal connected to the second terminals of the second windings in the first and second pairs, and first, second, third and fourth unidirectional means each having members corresponding to a plate and a cathode, the members corresponding to the plates of the first and second unidirectional means being respectively connected to the second terminals of the first windings in the first and second pairs and the members corresponding to the cathodes of the third and fourth unidirectional means being respectively connected to the first terminals of the second windings in the first and second pairs and the members corresponding to the cathodes of the first and second unidirectional means and the members corresponding to the plates of the third and fourth unidirectional means having a common terminal to provide paths to the load for a flow of load current upon a saturation of one of the cores in the half cycles and for the prevention of any saturation of the other cores in the half cycles.

12. A magnetic amplifier, including, a first saturable core, a second saturable core, a first pair of windings magnetically coupled to the first core, a second pair of windings magnetically coupled to the second core, means for introducing cyclic line voltage to the line windings to produce flux in the cores for producing core saturations, the windings in the first and second pairs being connected in a bridge circuit in which the windings in each pair define opposite legs of the bridge, means for introducing signal energy differentially to the cores to produce a saturation of one of the cores before any saturation of the other core, a plurality of unidirectional means each connected to a different winding with the unidirectional means connected to the windings in each pair having the same polarity and an opposite polarity to the other pair of unidirectional means and with all of the unidirectional means having a common terminal to provide for a flow of load current through the windings in one of the pairs upon the saturation of the magnetically coupled core and to provide a short-circuited action on the windings in the other pair for preventing the core magnetically coupled to the windings in the other pair from saturating, and a load connected to one terminal of the bridge formed by the line windings to receive an output current upon a saturation of one of the cores in the half cycles and until the end of the half cycles.

13. A magnetic amplifier, including, a first saturable core, a second saturable core, a first pair of windings magnetically coupled to the first core, a second pair of windings magnetically coupled to the second core, the windings in the first and second pairs being connected in a bridge circuit in which the windings in each pair define opposite legs of the bridge, a third pair of windings each magnetically coupled to a different one of the cores, means for introducing cyclic line voltage to a first terminal of the bridge to obtain a flow of current through the windings in the first and second pairs in each half cycle of voltage for the production of flux in the cores, means for introducing signals to the third pair of windings to produce flux in the cores on a differential basis relative to the production of energy in the cores from the line voltage to obtain a saturation of one of the cores before any saturation of the other core, a load connected to a second terminal of the bridge opposite to the first terminal to receive an output current upon the saturation of one of the cores in the half cycles and until the end of the half cycles, and a plurality of unidirectional members each having a first terminal common with third and fourth terminals in the bridge opposite from the first and second terminals and each having a second terminal connected to a different one of the windings in the bridge, the unidirectional means connected to the windings in the first pair being included in the bridge with the same polarity and with a polarity opposite to the unidirectional means connected to the windings in the second pair.

References Cited in the file of this patent

UNITED STATES PATENTS

| | | |
|---|---|---|
| 2,734,165 | Lufcy et al. | Feb. 7, 1956 |

OTHER REFERENCES

Geyger: "Magnetic Amplifiers Circuits," McGraw-Hill Book Co. Inc., published January 1954; chapters 11 and 12, particularly Figs. 11.7, 11.8 and 12.6.

"Electronic Engineering," May 1954, pp. 180–185 (Fig. 6), A. E. Maine, "High Speed Magnetic Amplifiers."